United States Patent Office 3,434,135
Patented Mar. 18, 1969

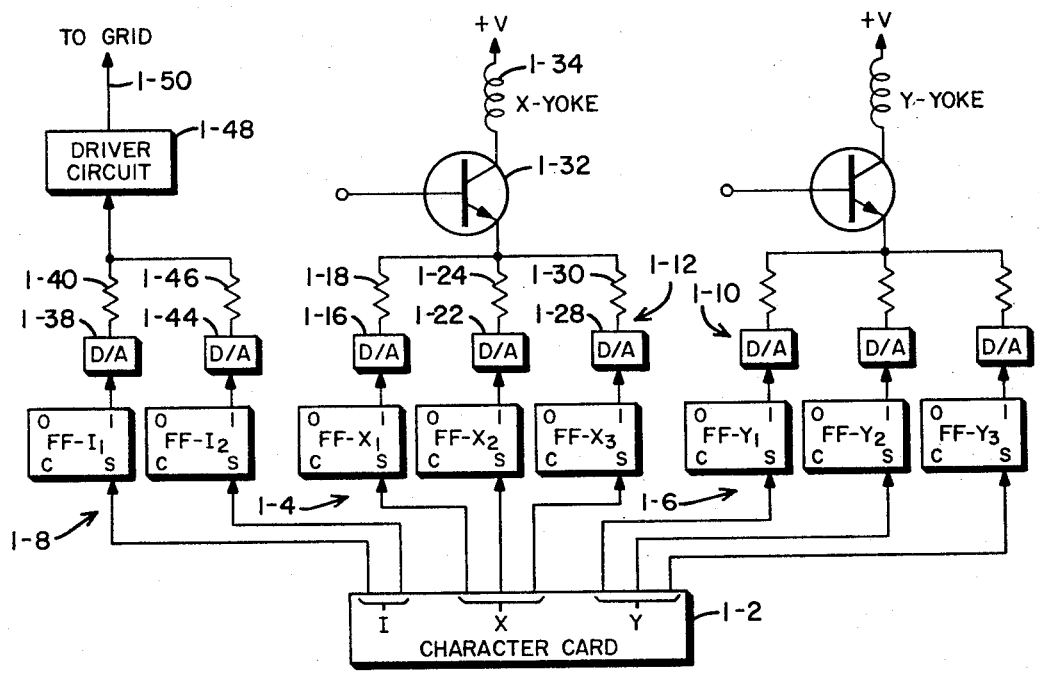
PRIOR ART
*Fig. 1*
*Fig. 2*
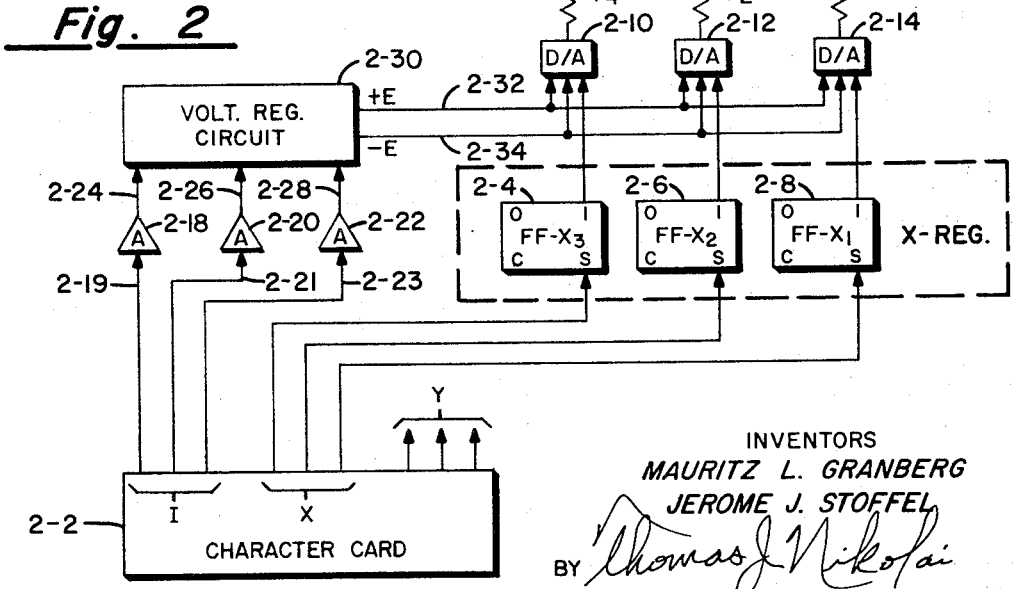
INVENTORS
MAURITZ L. GRANBERG
JEROME J. STOFFEL
BY Thomas J. Nikolai
ATTORNEY

3,434,135
CONSTANT VELOCITY BEAM DEFLECTION CONTROL RESPONSIVE TO DIGITAL SIGNALS DEFINING LENGTH AND END POINTS OF VECTORS
Mauritz L. Granberg, Minneapolis, and Jerome J. Stoffel, Farmington, Minn., assignors to Sperry Rand Corporation, New York, N.Y., a corporation of Delaware
Filed Aug. 1, 1966, Ser. No. 569,181
U.S. Cl. 340—324                                      1 Claim
Int. Cl. G06f 3/14

ABSTRACT OF THE DISCLOSURE

A writing circuit for cathode-ray tube display apparatus in which the intensity of the trace is controlled to produce a constant intensity irrespective of the length of the character stroke. This is a accomplished by controlling the slope of the output current ramp deflection signal obtained from the digital-to-analog converters as a function of the character length so that a constant writing rate is established.

---

This invention relates to a device for providing a constant rate writing technique whereby a vector or a character is formed which exhibits a uniform intensity over all its component segments even though the segments may vary in length.

In particular the device relates to the idea and method of varying the digital-to-analog converter supply voltage to effect the corresponding change in the slope of the current ramp produced therefrom so that vector or character segments of different lengths may be formed at a constant writing rate ultimately producing a vector or a character exhibiting a uniform intensity over all its component parts.

Further, the invention includes a voltage regulator circuit which monitors and maintains a fixed voltage in the emitter leg of the current driver for the electromagnetic deflection circuit notwithstanding wide changes in the load thus ensuring good linearity for accurate metering of the deflection coil current.

In prior art digital character generator systems, one of two methods was used to obtain uniform intensity of character segments. One of these methods was to modulate the control grid of the cathode ray tube in order to effect a uniform intensity. This was the method used in commonly assigned copending application Ser. No. 436,174, filed Mar. 1, 1965. In this commonly assigned application, the segment lengths were variable and the intensity of each segment of a character was also made variable. Moreover, each segment was formed in the same increment of time no matter how long or how short the segment. For each segment of a particular character, a binary code was used to represent the intensity of the electron beam during the formation of that segment. When the segment was of a maximum length, the associated intensity code would be encoded so as to cause a minimum negative voltage to be placed on the control grid of the cathode ray tube so that maximum intensity was applied in forming the segment. When the segment was of a minimum length, the corresponding encoded intensity bit would effect a maximum negative voltage on the control grid of the cathode ray tube so that minimum intensity would be applied in the formation of the segment. The problem encountered with this scheme is that it is difficult to maintain a linear relationship between overall screen intensity and control grid voltage. As a result, some character segments appeared brighter than others at certain intensity levels.

The second method for providing a uniform intensity over all of the character component segments was to form each segment of the character in the same increment of time. In this method, the length of the segments are always the same. It can be seen that the difficulty with this system is that if all segments are to be of equal length, more segments and more time is usually required to define a character than would be necessary if the segment length could be made variable.

The present invention overcomes the deficiencies of the prior art systems by providing a unique constant writing rate approach wherein character segments of varying lengths are formed within time increments proportional to the length of the segment being formed. That is, a short segment is formed in a short increment of time relative to the time increment required to form a long segment. Since the beam is writing at a constant rate, each segment of the character generated will be of essentially equal intensity. In order to accomplish this, the the slope of the current ramp from the operational amplifiers in the digital-to-analog converters is made variable to control the time increment allotted for the formation of a segment. The final value of the current ramp controls the segment length. The slope of the ramp, the rise or fall time, is used to control the time increment required to form the segment. The slope of the ramp in turn is controlled by varying, in predetermined increments, first and second supply voltages to the digital-to-analog converters. Thus, to decerase the slope, that is, to increase the time increment required to form a long segment, the first and second supply voltages are simultaneously lowered. To increase the slope, that is, to decrease the time increment required to form a short segment, the first and second supply voltages are simultaneously increased. The selection of the appropriate first and second voltage values which are required to control the time increments for forming a particular character segment is achieved by using the binary coded intensity bits which were used in prior art systems to represent the intensity of the electron beam during the formation of a particular segment.

In the copending application Ser. No. 436,174, the intensity bits are included with the X, Y position information stored on character cards. These cards of an 8-by-8 encoded diode matrix wherein each column in the matrix contains the X, Y and intensity information required to form a segment of a particular character. At write time, a selected character card is pulsed by an 8 phase clock. The 8 phases of the clock sequentially drive the 8 columns of the diode matrix. As the X, Y deflection information for a character segment is gated into the appropriate position registers and applied to the digital-to-analog converters, the associated intensity signals are applied to the grid of the cathode ray tube. In the present case, however, they are applied to the appropriate stages of a voltage regulator circuit. This circuit is comprised of complementary transistors stages which produce increments of current proportional to the binary power series of the applied intensity signals. These currents are summed and determine the conductivity of the complementary voltage regulator transistors. The resultant outputs are indicative of the binary value of the intensity bits. The outputs are simultaneously applied to the appropriate voltage terminals of the X and Y digital-to-analog converters and a current ramp is produced having a controlled slope which is determinative of the time increment required to form the character segment.

Once the character segment is formed, this condition is immediately sensed by a slope detector circuit and an enable signal will be produced therefrom to gate the next character segment into the X, Y position registers. Concurrently, an enable signal, after suitable delay, will be applied to a phase generator to initiate selection of the next segment. Using this approach, the rate at which segments are formed is not dictated by the time increment required to form the longest segment but instead the system may progress at a rate consistent with the actual length of the segment being formed.

These and other more detailed and specific objects will be disclosed in the course of the following specification, reference being had to the accompanying drawings, in which:

FIG. 1 illustrates a prior art system for X, Y positioning and intensity control;

FIG. 2 illustrates how the circuit of the present invention utilizes a constant writing rate to control beam intensity instead of modulating the grid of a cathode ray tube;

Figure 7A:
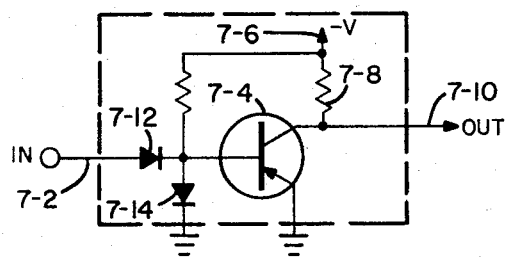
Figure 7B:
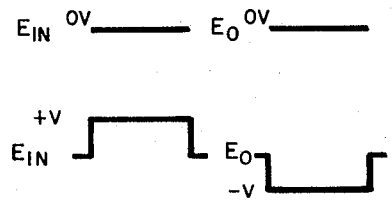
Figure 8:
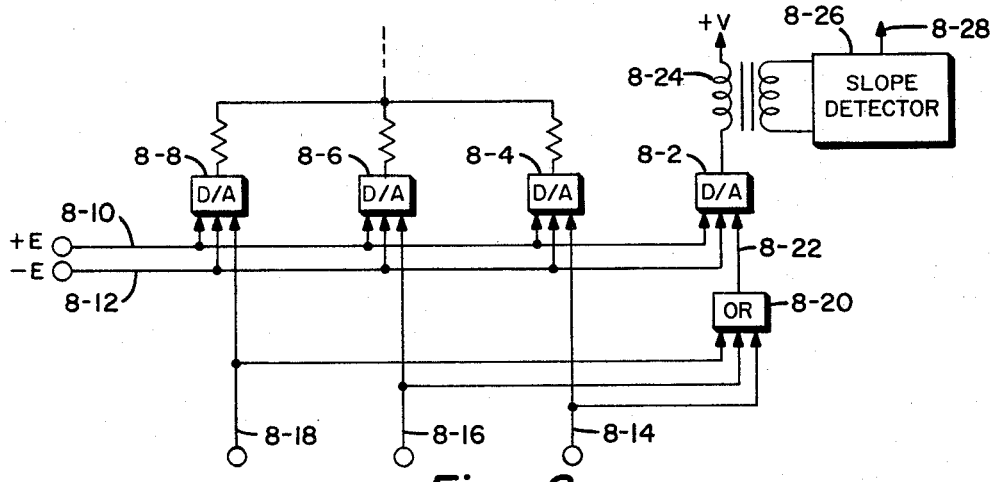
Figure 9A:
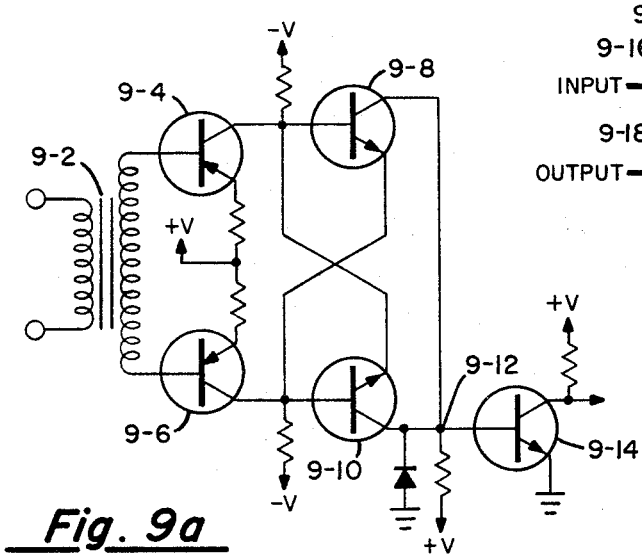
Figure 9B:
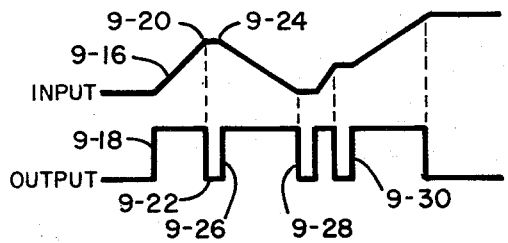

FIGS. 7(a) and 7(b) illustrates an interface unit and the related input and output voltages;

FIG. 8 illustrates the use of a slope detector for determining when a line segment has been completed and a new segment can be begun; and FIGS. 9(a) and 9(b) disclose the details of and the associated waveforms related to the slope detector.

FIG. 1 illustrates the prior art system for X, Y positioning and intensity control as utilized in copending application Ser. No. 436,174. The character card 1-2 produces digital output signals which represent the beam position along the X and Y axes as well as bits which represent the intensity of the beam. The three bits representing the X-position of the beam are stored in X-registers 1-4 while the bits representing the beam position along the Y-axis are stored in the stages of register 1-6. The two bits representing the beam intensity are stored in registers 1-8. Assuming a single ended deflection system as shown, the two identical three bit digital-to-analog converters 1-10 and 1-12 are used to cause the cathode ray tube electron beam to be positioned or deflected in X and Y by providing incremental current steps to their respective yokes which are proportional to the weighted values in the X, Y position registers. For example, the output of the least significant stage 1-14 which stores bit $X_1$ would control a digital-to-analog converted 1-16 whose active output through resistor 1-18 is an increment of current I. The next significant stage 1-20 would control digital-to-analog converter 1-22 whose active output through resistor 1-24 is 2I. The third significant stage 1-26 which stores bit $X_3$ would control digital-to-analog converter 1-28 whose active output through resistor 1-30 is 4I. Thus, the ramp outputs for the X values are tied together at one end of the resistor network and the summed current then flows through the curernt driver 1-32 and the deflection yoke 1-34 to cause the X-deflection. The Y-deflection circuit operates in a similar manner. The two bits representing the beam intensity from the character card 1-2 are coupled to the two stages of the intensity register 1-8. Stage 1-36 stores the least significant bit and controls digital-to-analog converter 1-38 whose active output through resistor 1-40 is an increment of current I. Stage 1-42 controls digital-to-analog converter 1-44 and causes it to have an active output through resistor 1-46 representing 2I increments of current. The ramp outputs for the intensity values are tied together at one end of the resistor network and the summed current, 1I and/or 2I, then flows through driver circuit 1-48 which causes a voltage to be applied to the grid of the cathode ray tube on line 1-50 to control the beam intensity.

FIG. 2 shows how the circuit of the present invention utilizes a constant writing rate to control beam intensity instead of modulating the grid of the cathode ray tube. The X outputs of the character cards 2-2 are shown connected to the stages 2-4, 2-6 and 2-8 of the X-position register. These stages are coupled respectively to digital-to-analog converters 2-10, 2-12 and 2-14 each of which has a resistor which controls the amount of current produced by that D-to-A converter. The outputs of these resistors are connected together and couple to current driver 2-16. The circuit of FIG. 2 thus described operates in a manner similar to the circuit shown in FIG. 1. However, three intensity bits are provided by character card 2-2 and are connected to amplifiers 2-18, 2-20 and 2-22. Amplifier 2-18 will produce an output on line 2-24 whenever an intensity bit is present on line 2-19. Amplifier 2-20 will produce an output on line 2-26 whenever an intensity bit is present on line 2-21. Finally, amplifier 2-22 will produce an output on line 2-28 whenever an intensity bit is present on line 2-23. The combination of eight possible outputs from the three amplifiers 2-18, 2-20 and 2-22 are coupled to the voltage regulator circuit 2-30 which produces outputs on lines 2-32 and 2-34 which are coupled to each of the digital-to-analog converters 2-10, 2-12 and 2-14. The signal on line 2-32 is a variable positive voltage while the signal on line 2-34 is a variable negative voltage with respect to a predetermined threshold. These two voltages when coupled to the digital-to-analog converters are used to vary the slope of the current ramp produced by the D-to-A converters.

Thus, the digital-to-analog converters plus the X-position register stages form means for producing a variable slope ramp output current for moving a cathode ray tube electron beam. Also, the intensity bits produced by said character card are indicative of a line segment length. Further, the voltage regulator circuit receives the intensity bits and produces control signals which are coupled to the digital-to-analog converters for varying the slope of the ramp output current in proportion to the length of the line segment being formed.

The Y-outputs from the character card 2-2 are not shown connected for purposes of simplicity of the drawings, but it is obvious that they would be connected to Y-position registers similar to the X-position registers and that the remaining circuitry would also be similar.

Figure 3:
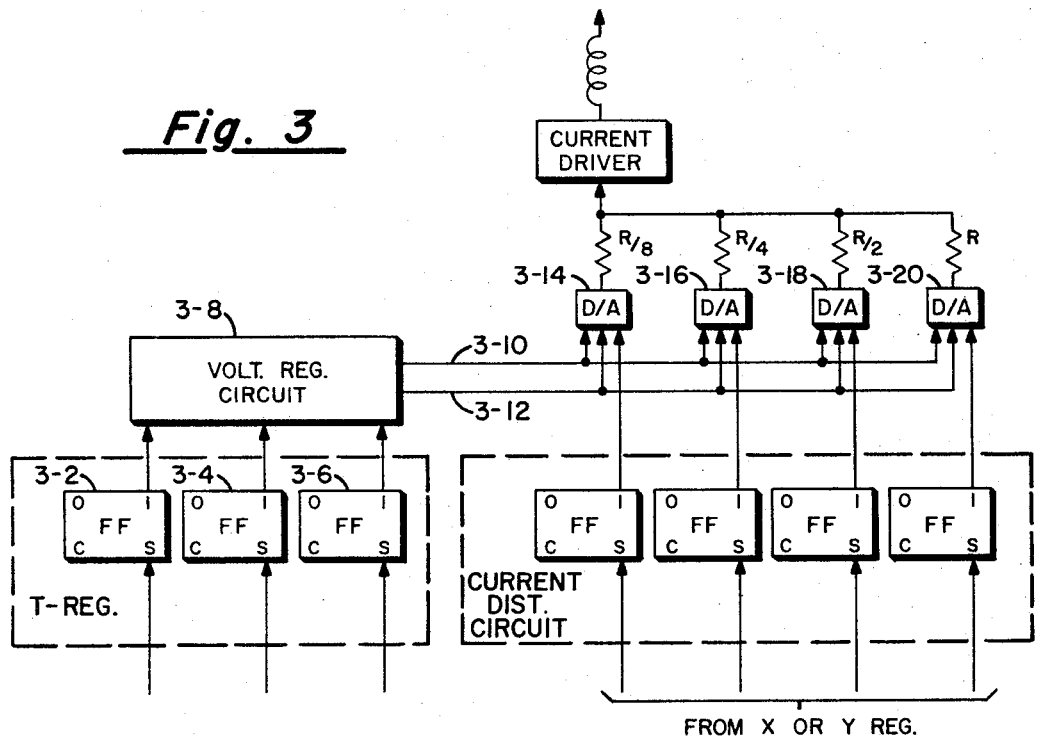
FIG. 3 illustrates the use of the present invention to control intensity of the beam of a vector generator.

In commonly assigned copending application Ser. No. 569,481, filed Aug. 1, 1966, and entitled, Digital Vector Generator, the intensity of the electron beam is controlled according to the angle at which the vector is being drawn. This angle is stored in digital form in what is known as the Tangent Register and three stages of this register produce outputs which are used to control the intensity through digital-to-analog converters. FIG. 3 shows how these outputs from the stages of the Tangent Register can be used with the circuit of the present invention to control the intensity of the beam of the vector generator by using a constant writing rate.

The outputs from the three stages of the Tangent Register 3-2, 3-4 and 3-6 are coupled to the voltage regulator circuit 3-8. The output of the voltage regulator circuit on lines 3-10 and 3-12 are coupled to digital-to-analog converters 3-14, 3-16, 3-18 and 3-20. As explained previously in relation to FIG. 2, the voltage outputs from the voltage regulator circuit are variable positive and negative of voltages which are used to regulate the current ramp output from each of the digital-to-analog converters. The inputs to the digital-to-analog converters are taken from the stages of the current distribution circuit 3-22.

Figure 4:
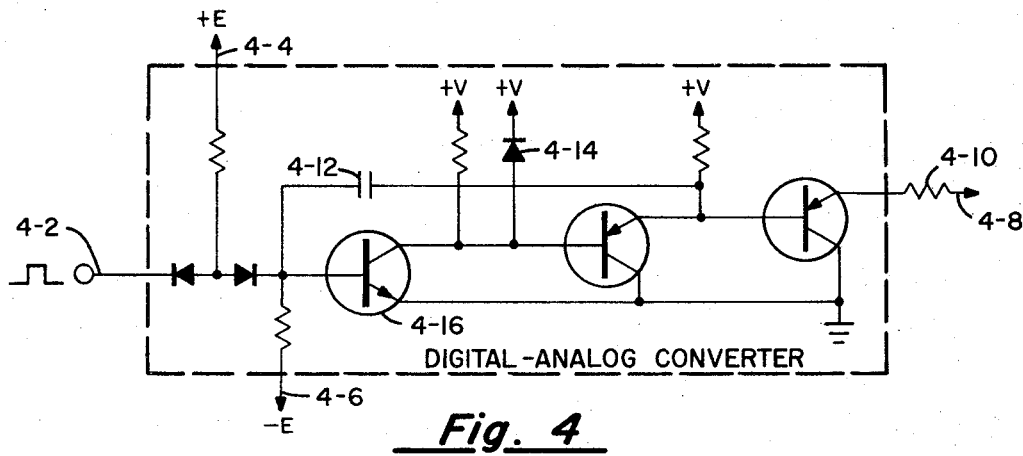
FIG. 4 is a circuit diagram of a prior art digital-to-analog converter.

FIG. 4 is a circuit diagram of a digital-to-analog converter similar to that shown in Patent No. 3,192,403, assigned to the assignee of the instant invention. This is a circuit which governs the rise and fall time of the signal produced at its output. The input terminal is shown as terminal 4-2 while terminal 4-4 receives the positive varying voltage and terminal 4-6 receives the negative varying voltage. The output of the circuit is produced on line 4–8 through metering resistor 4–10. As stated previously, the final value of the current ramp controls the segment length while the slope or rise and fall time of the ramp is used to control the time increment required to form the segment. The slope of the ramp in turn is controlled by varying, in predetermined increments, the positive and negative supply voltages to the D-to-A converter on lines 4—4 and 4–6 from the voltage regulator. To decrease this slope, that is, to increase the time increment required to form a long segment, both supply voltages are simultaneously lowered. To increase the slope, that is, to decrease the time increment required to form a short segment, both supply voltages are simultaneously increased.

The time required to charge up capacitor 4–12 determines the slope of the digital-to-analog converter output voltage. The capacitor will change in time, $t$, according to the equation:

(1) $\quad t = CV/I$ where C is the value of the capacitor, V is the voltage to which the capacitor must charge as determined by the clamping diode 4–14 and I is the current applied to the base of transistor 4–16. By changing the control voltages, +E and —E, on lines 4–4 and 4–6 respectively, the current, I, varies and according to Equation 1, $t$ also varies. Thus, it can be seen that if the control voltages, +E and —E, increase, the current, I, increases and, since $t$ is inversely proportional to I, $t$ decreases which means that the slope of the output voltage increases.

As stated previously, the voltage regulator utilizes the binary encoded bits to select the appropriate positive and negative supply voltages values which are required to control the time increment for forming a particular character segment or vector.

Figure 5:
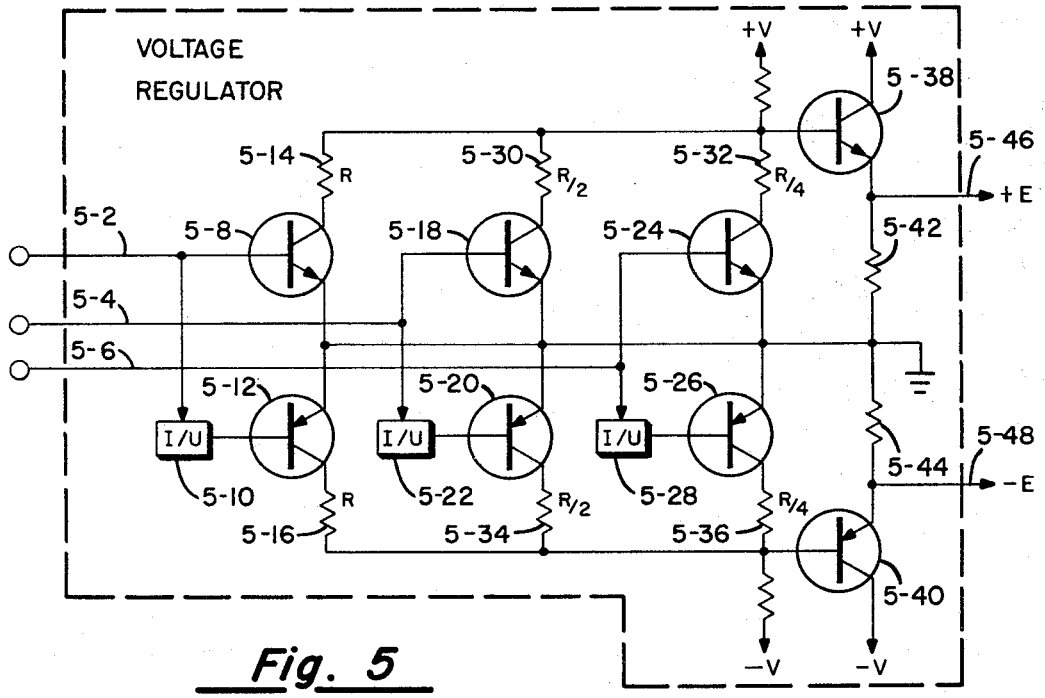
FIG. 5 illustrates a voltage regulator unit for controlling the slope of the output of a digital-to-analog converter such as shown in FIG. 4.

FIG. 5 discloses a voltage regulator circuit. This circuit is comprised of complementary pairs of first and second polarity transistors which produce increments of voltage proportional to the binary power series of the applied intensity bits. These bits are digital signals indicative of the line segment length. These voltages are summed and determine the conductivity of the complementary voltage regulator driving transistors. The resultant outputs are indicative of the binary value of the intensity bit. The outputs are simultaneously applied to the appropriate voltage terminal of the X and Y digital-to-analog converters and a current ramp will be produced therefrom having a controlled slope which is determinative of the time increment required to form the character segment. Lines 5–2, 5–4, and 5–6 receive combination of the signals from either amplifiers 2–18, 2–20 and 2–22 of FIG. 2 or the signals from the stages 3–2, 3–4 and 3–6 of FIG. 3. The signal on line 5–2 is coupled to the base of transistor 5–8 and also to interface unit 5–10. The interface units allow simultaneous switching of the complementary transistors. Thus, transistors 5–8 and 5–12 are complementary transistors and both conduct simultaneously when a signal is present on line 5–2. Interface unit 5–10 causes a negative voltage to be produced when it has a positive voltage as an input. Thus, the positive voltage drop across resistor 5–14 increases when a signal is present on line 5–2 while simultaneously the negative voltage drop across resistor 5–16 increases in a like manner. Transistor pair 5–18 and 5–20 along with interface unit 5–22 operates in the same manner as described for transistor pairs 5–8 and 5–12 with its associated interface unit 5–10. Transistor pair 5–24 and 5–26 associated with interface unit 5–28 also operates in a similar manner.

It will be noted however that resistors 5–14, 5–30 and 5–32 form a geometric progression. Thus, resistor 5–14 has a resistance value of R while resistor 5–30 has a value of $R/2$ and resistor 5–32 has a resistance value of $R/4$. In a like manner on the other side of the voltage regulator unit, resistor 5–16 has a value of R while resistor 5–34 has a value of $R/2$ and resistor 5–36 has a value of $R/4$. Thus, the three pairs of complementary transistors are able to produce 8 different values of complementary positive and negative voltages depending upon the input signals on input lines 5–2, 5–4 and 5–6. The positive voltages developed by the complementary transistors in voltage regulator are coupled to the driving transistor 5–38 while the negative voltage developed by the complementary transistors is coupled to driving transistor 5–40. The emitter follower output is developed across load resistors 5–42 and 5–44 respectively. Thus, line 5–46 couples the positive varying voltage to the digital-to-analog converters while line 5–48 couples the negative varying voltage to the digital-to-analog converters.

When the digital-to-analog converter of FIG. 4 is used with the Voltage Regulator of FIG. 5, a wide range of control voltages, +E and —E, is required to cause sufficient variation of the current, I, to produce 8 different slopes. Transistors 5–38 and 5–40 and associated components shown in FIG. 5 are required to handle this large variation of voltage. Special types of components are thus required.

Figure 6:
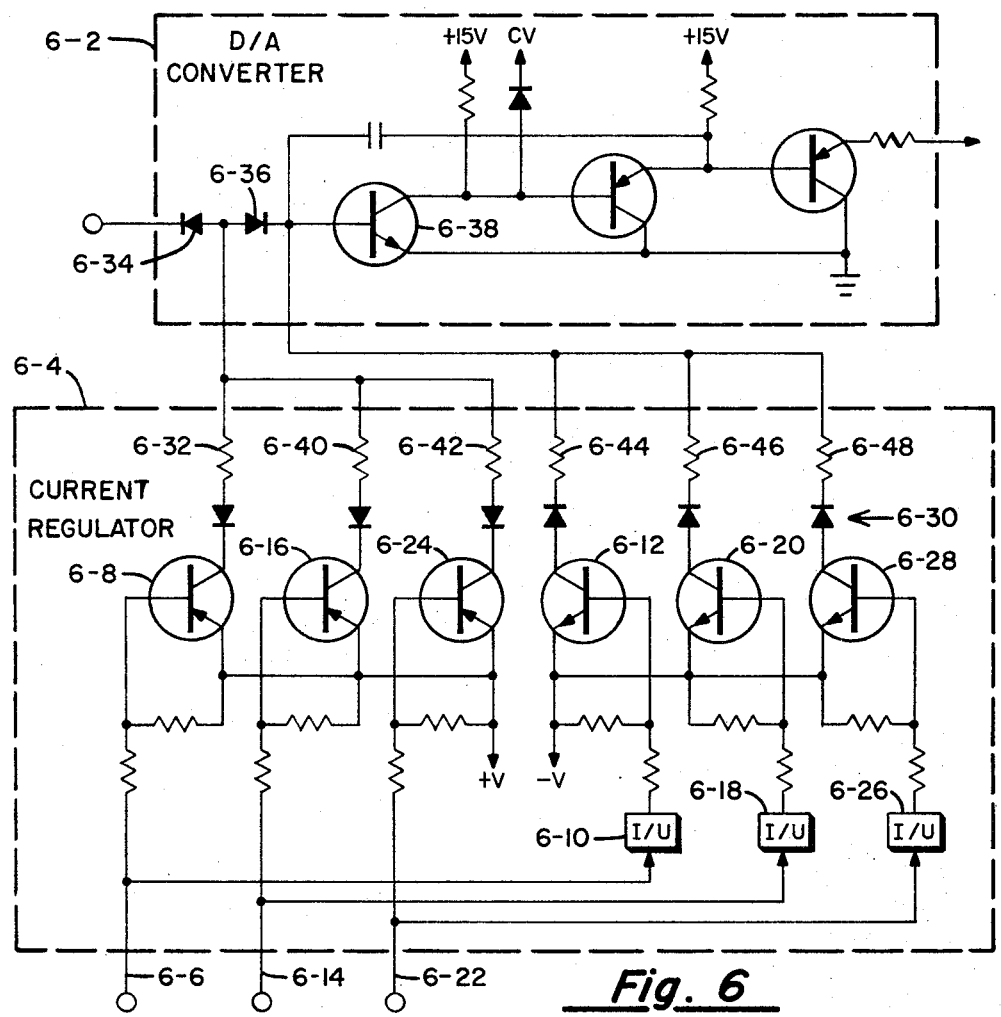
FIG. 6 illustrates a current regulator controlling the slope of the output of the digital-to-analog converter.

A preferred embodiment of the Voltage Regulator Unit is shown in FIG. 6 which avoids the above problems. Digital-to-analog converter 6–2 is the same as is shown in FIG. 4 except for the manner in which the control voltages, +E and —E, are connected to it. The Voltage Regulator Unit is shown enclosed by dashed line 6–4. In the same manner as explained for the regulator shown in FIG. 5, the input signal on line 6—6 is coupled to the base of transistor 6–8 and also, through interface unit 6–10, to the base of transistor 6–12. As stated earlier, the interface unit allows simultaneous switching of the complementary transistors. The details of the interface unit will be explained in relation to FIG. 7. In a like manner, the input signal on line 6–14 is coupled to the base of transistor 6–16 and, through interface unit 6–18, to the base of transistor 6–20. Also, the input signal on line 6–22 is coupled to the base of transistor 6–24 and, through interface unit 6–26, to the base of transistor 6–28. The output of each transistor is coupled through an isolation diode and a metering resistor to the digital-to-analog converter. Thus, the output of transistor 6–8 is coupled through isolation diode 6–30 and metering resistor 6–32 to the junction of diodes 6–34 and 6–36 in the digital-to-analog converter. In a like manner, the outputs of transistors 6–16 and 6–24 are also coupled to the digital-to-analog converter. The outputs of the three complementary transistors are coupled through isolation diodes and metering resistors to the junction of diode 6–36 and the base of transistor 6–38. Again, the resistance values of metering resistors 6–32, 6–40 and 6–42 form a geometrical progression as well as do the resistance values of resistors 6–44, 6–46 and 6–48. Thus, resistor 6–32 may have a value of R, resistor 6–40 a value of $R/2$ and resistor 6–42 a value of $R/4$. In a like manner, resistor 6–44 may have a value of R, resistor 6–46 a value of $R/2$ and resistor 6–48 a value of $R/4$. Thus, the voltage drop across each resistor will be the same but because of the different resistance values, the current through each resistor will vary to cause the current, I, of Equation 1 to vary. Therefore, the circuit of FIG. 6 is not required to handle a large variation of voltages as is the circuit of FIG. 5.

A typical interface unit is shown in FIG. 7(a). The inputs to the interface unit will be either 0 volt or a positive voltage. With 0 input voltage on line 7–2, transistor 7–4 conducts and causes the negative voltage from source 7–6 to be completely dropped across resistor 7–8 thus causing 0 voltage to appear on output line 7–10. This is shown in FIG. 7(b). If a positive voltage is present on input line 7–2, diode 7–12 conducts it to the base of transistor 7–4 causing transistor 7–4 to be cut-off. Thus, with no current flowing through load resistor 7–8, the full negative voltage from source 7–6 is present on output line 7–10. Diode 7–14 limits the base voltage to the transistor whenever the positive voltage is applied to input line 7–2. FIG. 7(b) shows the waveforms when a positive voltage is applied to the interface unit.

Since the present invention utilizes variable length segments to form characters and since the time, t required for drawing each segment varies according to the slope of the ramp output voltage, it is obvious that a new segment cannot be drawn until the time, t has expired for the individual segment. Thus, a gating signal is required to start the new segment when the old is completed. This can be accomplished with a slope detector circuit as shown in FIG. 8.

The ramp output voltage of the digital-to-analog converter 8–2 has the same slope as the ramp output voltage of digital-to-analog converters 8–4, 8–6 and 8–8 since control voltages +E and —E on lines 8–10 and 8–12 respectively which control the slope of the ramp output voltage are coupled in parallel to all digital-to-analog converters. Further, the inputs to digital-to-analog converters 8–4, 8–6 and 8–8 on lines 8–14, 8–16 and 8–18 respectively are also coupled through OR gate 8–20 on line 8–22 as an input to digital-to-analog converter 8–2. Thus, whenever any of the digital-to-analog converters 8–4, 8–6 or 8–8 have an input and begins to produce a ramp output with a certain slope, digital-to-analog converter 8–2 also has an input and begins to produce a ramp output voltage that has the same slope. This output is coupled through transformer 8–24 to slope detector 8–26 which produces an output signal on line 8–28. This output signal will remain until the output voltage from digital-to-analog converter 8–2 ceases to change. At this time, the signal on line 8–28 can be used as a gating signal to gate signals representing a new character segment into the digital-to-analog converters.

FIG. 9(a) discloses the circuit details of the slope detector 8–26 shown in FIG. 8. Transformer 9–2 is the same as transformer 8–24 shown in FIG. 8. The ramp output voltage developed by the digital-to-analog converter is coupled through transformer 9–2 to the base of transistors 9–4 and 9–6. These transistors are connected such that one of them will conduct no matter whether the ramp voltage is positive going or negative going. Transistors 9–8 and 9–10 are so connected to transistors 9–4 and 9–6 that a negative output signal will be produced at junction 9–12 when an input occurs to transformer 9–2. If necessary, junction 9–12 may be connected to a driving circuit such as transistor 9–14.

Thus, as shown in FIG. 9(b), when the input ramp voltage at transformer 9–2 begins to increase as shown by slops 9–16, an output is produced by transistor 9–14 as shown by waveform 9–18. When the magnitude of the slope ceases to increase as shown by point 9–20, the output is removed as shown by waveform 9–22. At this time, however, the output signal is used to gate new character segment signals to the digital-to-analog converters and a new output slope is produced as shown by waveform 9–24. The remaining waveforms show obvious extensions of the principle. Pulses 9–26, 9–28 and 9–30 represent the time required for the gating signal to gate the new character segment signals to the digital-to-analog converters. It should be pointed out that the above described slope detector provides only one of many devices for accomplishing the desired purpose. Any of the well known slope detectors will function equally well.

Thus, in summary, the present invention utilizes digital-to-analog converters whose supply voltages can be varied to effect a corresponding change in the slope of the current ramp produced therefrom. A voltage regulator circuit is also disclosed which accepts intensity bits and produces output voltages, both positive and negative, which are variable and which are used to control the rise and fall time of the current ramp produced by the digital-to-analog converters. Thus, vector or character segments of different lengths may be formed at a constant writing rate thus producing characters or vectors which exhibit uniform intensity regardless of their length or the length of their component parts.

It is understood that suitable modifications may be made in the structure as disclosed provided such modifications come within the spirit and scope of the appended claim.

Having now, therefore, fully illustrated and described our invention, what we claim to be new and desire to protect by Letters Patent is:

1. A constant writing rate control circuit for a cathode-ray tube display apparatus comprising:
   first register means for storing binary signals in different stages thereof, said binary signals being representative of the length of a line segment to be presented on said display apparatus
   at least one additional register means for storing binary signals in different stages thereof, said binary signals being representative of the coordinate location to which the electron beam is to be moved
   a plurality of digital-to-analog converter circuits individually coupled to the output of said different stages of said additional register for producing deflection signals for said electron beam
   a plurality of complementary pairs of first and second polarity transistors coupled to said first register to receive said signals representative of the length of a line segment,
   first and second groups of parallel resistors, the values of each group forming a geometric progression, each of the resistors in said first group being connected at one end to the output electrode of a corresponding one of said first polarity transistors and each of said resistors in said second group being connected to the output electrode of a corresponding one of said second polarity transistors,
   first and second semiconductor current amplifying means for receiving the combined outputs from the other ends of said first and second parallel groups of resistors respectively and for producing first and second control voltage signals of opposite polarity, and
   means connecting said first and second control voltage signals to said plurality of digital-to-analog converter circuits such that the magnitude of said deflection signals is proportional to length of the line segment being formed.

References Cited

UNITED STATES PATENTS

| | | | |
|---|---|---|---|
| 3,281,831 | 10/1966 | Yanihhensky | 340—324 |
| 3,311,908 | 3/1967 | Halsted et al. | 340—324 |
| 3,320,595 | 5/1967 | Yanisnensky | 340—324 |
| 3,325,802 | 6/1967 | Bacon | 340—324 |
| 3,325,803 | 6/1967 | Carlock | 340—324 |
| 3,329,948 | 7/1967 | Halsted | 340—324 |

JOHN W. CALDWELL, *Primary Examiner.*

A. J. KASPER, *Assistant Examiner.*

U.S. Cl. X.R.

315—18; 178—7.7